United States Patent
Dahlbäck et al.

(10) Patent No.: US 6,585,835 B1
(45) Date of Patent: Jul. 1, 2003

(54) METHOD OF MANUFACTURING A ZIRCONIUM BASED ALLOY COMPONENT FOR USE IN NUCLEAR INDUSTRY

(75) Inventors: Mats Dahlbäck, Västerås (SE); Gunnar Wikmark, Uppsala (SE)

(73) Assignee: Westinghouse Atom AB, Västerås (SE)

( * ) Notice: Subject to any disclaimer, the term of this patent is extended or adjusted under 35 U.S.C. 154(b) by 0 days.

(21) Appl. No.: 09/830,120

(22) PCT Filed: Nov. 12, 1999

(86) PCT No.: PCT/SE99/02069

§ 371 (c)(1),
(2), (4) Date: Jul. 25, 2001

(87) PCT Pub. No.: WO00/29633

PCT Pub. Date: May 25, 2000

(30) Foreign Application Priority Data

Nov. 12, 1998 (SE) ................................................ 9803870

(51) Int. Cl.⁷ .................................................. C22F 1/18
(52) U.S. Cl. ........................................................ 148/672
(58) Field of Search ......................................... 148/672

(56) References Cited

U.S. PATENT DOCUMENTS

| | | | |
|---|---|---|---|
| 3,865,635 A | | 2/1975 | Hofvenstam et al. |
| 4,294,631 A | | 10/1981 | Anthony et al. |
| 5,361,282 A | | 11/1994 | Adamson et al. |
| 5,519,748 A | * | 5/1996 | Adamson et al. ............ 148/519 |
| 5,618,356 A | * | 4/1997 | Adamson et al. ............ 148/519 |
| 5,876,524 A | * | 3/1999 | Andersson ................... 148/519 |

FOREIGN PATENT DOCUMENTS

| | | |
|---|---|---|
| SE | 426890 | 2/1983 |
| SE | 451467 | 10/1987 |
| SE | 452479 | 11/1987 |
| WO | WO92/02654 | 2/1992 |
| WO | WO95/01639 | 1/1995 |

* cited by examiner

Primary Examiner—Roy King
Assistant Examiner—Andrew Wessman
(74) Attorney, Agent, or Firm—Swidler Berlin Shereff Friedman, LLP

(57) ABSTRACT

A method for producing a component intended to be subjected to an increased radiation in a corrosive environment, wherein the component includes an alloy which at a first, high temperature has a BCC-structure and which at a second, lower temperature has an HCP-structure, wherein the alloy includes at least one alloying element which has a low solubility in the HCP-structure and wherein the alloy is rapidly cooled from the first to the second temperature while secondary phase particles, which include said alloying element and which contribute to improve corrosion properties are separated in the HCP-structure. The rapid cooling is performed in two stages, wherein the first stage includes a rapid cooling at a relatively lower intensity and the second, subsequent stage includes a rapid cooling at a relatively higher intensity.

15 Claims, No Drawings

METHOD OF MANUFACTURING A ZIRCONIUM BASED ALLOY COMPONENT FOR USE IN NUCLEAR INDUSTRY

THE BACKGROUND OF THE INVENTION AND PRIOR ART

The present invention refers to a method for producing a component suited to be subjected to an increased radiation in a corrosive environment, wherein the component includes an alloy, which at a first, high temperature has a BCC-structure and which at a second, lower temperature has an HCP-structure, wherein the alloy includes at least one alloying element which has a low solubility in the HCP-structure and wherein the alloy is rapidly cooled from the first temperature to the second temperature while secondary phase particles, which include said alloying element and which contribute to improved corrosion properties of the alloy, are separated in the HCP-structure.

Methods of this kind are previously known for the production of components, which include zirconium-based alloys and which are to be provided in nuclear power plants, or more precisely in the area of the core of such plants. The rapid cooling involves cooling of the zirconium-based alloy from a first, high temperature, where it is present as a β-phase with BCC-structure, to a second, lower temperature at which the alloy is present as a α-phase with HCP-structure. The method is well known and is called β-quenching. One purpose of the β-quenching is the possibility to remove a directed texture, which the alloy normally will have in the production thereof and which results in a differing tendency of the alloy to grow in different directions when it is subjected to the radioactive radiation in a nuclear power plant. Thanks to the β-quenching it is thus possible, for instance, to avoid growth of such components as cladding tubes in their longitudinal direction and the risk that such components are seriously damaged due to bending as a result thereof. Another example is spacer sheets which thereby are prevented from growing in such directions that unnecessary large plays are present between these and the cladding tubes which they are arranged to hold, which plays result in a disadvantageous wear of the cladding tubes. By the β-quenching of sheets for boxes in nuclear power plants, it is also possible to avoid any preferential growth in axial direction when being radiated. Such a growth would otherwise lead to bending of the box, which in its turn results in known resulting problems in the reactor core.

The β-quenching also means that the result of previous heat treatments from the structure of the alloy are removed, which makes it possible to remove rough, structures which are not desired. In the β-quenching α-lamellae are formed, or more precisely packages of α-lamellae in the β-particles which the alloy has in the β-phase area, i.e. the first higher, temperature. In order to obtain an advantageous structure of relatively short and thin α-lamellae and a plurality of α-lamellae packages in each original β-phase particle, the β-quenching ought to be relatively quick. Ordinary β-quenching therefore involves immersing of the component in a water pool, which results in a very rapid cooling of the alloy and consequently thin α-lamellae.

Outer surfaces of the component, at least some of which will be in immediate contact with a corrosive medium at the same time as they are subjected to radiation when the component is used, thereby will come into immediate contact with the cooling medium and be cooled significantly faster than core areas in the sheets, tubes, bars, etc., which are cooled in this manner. The secondary phase particles which are formed at the particle border areas in the α-phase will thereby not have time to grow to an optimal size with regard to their contribution to the corrosion resistance of the alloy. Outer layers having insufficient corrosion resistance are thus produced. According to previous technique this problem has been overcome by mechanically machining or if possible etching away such layers of said components.

Such a machining for removing such layers involves however a further operation stage in the production of such components, wherein this operation stage contributes to make the production of the component more difficult and in addition more expensive.

SUMMARY OF THE INVENTION

An object of the present invention is to provide a method which reduces or completely eliminates the need of machining away the outer layers of a β-quenched alloy of the kind initially defined due to the fact that these layers have achieved an insufficient corrosion resistance due to the cooling conditions to which the component is subjected during the β-quenching. The method is to make it possible to obtain a desired secondary phase particle size and distribution at said layer already at or immediately after the β-quenching.

These objects are obtained by a method of the initially defined type, which is characterised in that the rapid cooling is performed in two stages, wherein the first stage includes a rapid cooling at a relatively lower intensity and the second, subsequent stage involves a rapid cooling at a relatively higher intensity.

By such an initial less intensive cooling it is possible to give the secondary phase particles at the surface time to grow to larger particles during the cooling than during the more intensive cooling, whereby the corrosion resistance is improved in the area of said surface. By surface is meant, preferably, also the layer or layers of the alloy which are located most closely beneath said surface. However, it is logical to assume that these are cooled down more slowly than the surface and that these layers may be assumed to have a sufficient secondary phase particle size when the alloy at the surface has a sufficient secondary phase particle size with regard to the contribution of the secondary phase to the corrosion resistance. The secondary phase particles are preferably separated in the particle border areas of the second structure. Preferably, the first stage is controlled in such a way that the cooling velocity at least at an alloy surface of the component which is intended to be in direct contact with the corrosive environment is lower than what it should have been if the cooling was performed by ordinary quenching of the component in water. Thanks to the more slow cooling than what is normal of said alloy surface or the surface of the component, the secondary phase particles are given time to grow during the cooling to larger particles than during ordinary cooling by water.

The first structure is a BCC-structure and the second structure an HCP-structure. A typical such material is zirconium-based alloys. Such alloys have such properties that they are used in applications where they are subjected to an increased radiation in a corrosive environment, in particular in nuclear power plants. In addition, such alloys normally require a β-quenching in order to remove a directed texture which they have achieved in a previous producing stage.

According to a further preferred embodiment, the alloy is a zirconium-based alloy. Such alloys are frequently employed in components in nuclear power plants and have thereby surfaces which are in immediate contact with the surrounding corrosive environment, i.e. the surrounding corrosive medium, and which at the same time are subjected to an increased radiation.

According to a further preferred embodiment, said cooling velocity is less than 100° C./seconds, preferably less than 50° C./seconds, and most preferably less than 25° C./seconds. These cooling velocities are advantageous to zirconium-based alloys in general and zirconium-based alloys according to the specifications for Zircaloy-alloys, such as Zircaloy-2 and Zircaloy-4 in particular. Thanks to a sufficiently low cooling velocity, the particles are given sufficient time to grow to a size which promotes the corrosion resistance of the alloy.

According to a further preferred embodiment, a cooling medium with a lower cooling performance than water is employed at least during an initial phase of the cooling in order to obtain said control cooling velocity. Alternatively, water or any other medium having a similar cooling performance may be employed while avoiding to bring this medium into direct contact with such surfaces of the component which during use thereof will be in immediate contact with a corrosive medium and at which surfaces it is desirable to decrease the cooling velocity in comparison with the case when the surfaces would have been in immediate contact with a cooling medium with a cooling performance similar to the one of water. In an initial phase of the cooling, it is thus possible to cool the component in air, any gas or gas mixture, steam, for instance any liquid having a reduced heat-conducting capability in relation to water, for instance oil, or water having a relatively higher temperature. To a certain extent the cooling velocity may be controlled by a controlled circulation or stirring of the cooling medium, and by a suitable choice of the temperature of the cooling medium.

According to a further preferred embodiment, the cooling is performed in the first stage by bringing the component into contact with a first cooling medium having a lower cooling performance, whereafter it in the second stage is brought into contact with a second cooling medium having a higher cooling performance than the first cooling medium. By employing, at a later stage, cooling by means of a cooling medium having a higher cooling performance, it is in particular avoided that core areas of the components having a great wall thickness are cooled down too slowly. In the case of zirconium-based alloys, the cooling ought to be so fast that too long and thick α-lamellae are not formed in the material. By applying a more intensive cooling, for instance with a more effective cooling medium, it is possible to avoid that the cooling velocity falls below a lower limit at which α-lamellae having an acceptable length are obtained. Generally, a cooling velocity which is at least substantially lower than approximately 1° C./second is to be avoided in zirconium-based alloys. It is to be noted, that the first cooling medium may be the same but have a higher temperature than the second cooling medium. For instance, the temperature of the cooling medium in the first stage may be between 40 and 100° C., especially about 70° C. In the second stage, the cooling medium may have a normal room temperature between 0 and 30° C., especially about 20° C.

According to a further preferred embodiment, the cooling by means of the first cooling medium continues until a predetermined temperature is obtained at said component surface. Consequently, the cooling at said surface is controlled in such a way that a sufficiently low cooling velocity is obtained there in order to permit a sufficient growth of secondary phase particles. When the temperature at said surface has decreased to a value where it may be assumed that, at the given cooling velocity, the secondary phase particles have reached a sufficient size and distribution, a more effective cooling medium is thus applied in order to avoid a too slow cooling in other parts of the component.

According to a further preferred embodiment, the predetermined temperature lies in a range where at least a substantial part of the alloy at said surface of the component has been transferred from the first structure to the second structure. In the case of a zirconium-based alloy, the predetermined temperature thus lies in a temperature range where at least a substantial part of the alloy at said surface of the component has been transformed from β-phase to α-phase. Preferably, substantially all of the β-phase has been transformed to α-phase at said temperature. In addition, below this temperature the growth of secondary phase particles takes place much more slowly and a continuing cooling by means of the first cooling medium would merely have an insignificant effect to the secondary phase particle size at the surface in question.

According to a further preferred embodiment, the alloying element includes at least one of the elements Fe, Ni, Cr, V, W, Si. The different alloying elements in this group of alloying elements are used for different reasons in zirconium-based alloys. They have a low solubility in the α-phase but a significantly higher solubility in the β-phase, and will therefore be separated in the α-phase when the alloy is cooled from the β-phase to the α-phase. A precondition therefore is that the concentration of the alloying element or alloying elements exceeds the concentration which maximally may be dissolved in the α-phase. However, this concentration is low in the order of 200 ppm for zirconium-based alloys and is exceeded significantly in the alloys which are relevant in this case.

Further advantages and features of the invention will now appear from the following, detailed description, and from the remaining claims attached.

DETAILED DESCRIPTION OF A PREFERRED EMBODIMENT

A solid rod of a zirconium-based material which is intended to be drilled at a later stage and used as a cladding tube in a nuclear power plant has during the production thereof obtained a directed texture and possibly also a rough structure due to previous heat treatments. The directed structure has arisen as a consequence of the mechanical machining to which the rod has been subjected. In order to eliminate the directed texture and the possible rough structure in the material, the rod is heated to a temperature in the β-phase range of the alloy.

The alloy is retained in the β-phase range for an as short time period as possible in order to avoid unnecessarily large growth of the β-phase particles. Thereafter, the rod is cooled initially in a first cooling medium, which has a substantially lower cooling performance than water, for instance a gas and liquid. The liquid may for instance be oil or water having a temperature which is increased in relation to a normal room temperature, for instance 40–100° C., especially 70° C. The first cooling medium is selected to result in a certain cooling velocity of the outer surface of the rod, in the first place its peripheral surface, at a given rod dimension. The cooling velocity at said surface is to be such that a sufficient growth of secondary phase particles has been achieved in the alloy at the surface when the surface has reached a temperature at which further growth of secondary phase particles mainly is diffusion dependent and occurs relatively slowly. When said temperature has been reached at the surface of the rod, one continues successively or immediately to a cooling by a second cooling medium, which has a higher cooling performance than the first cooling medium. The second cooling medium is suitably water and in this case the cooling takes place by the second cooling medium by immersing the component, i.e. the rod in a pool of water which may have a temperature corresponding to a normal room temperature, for instance 10–30° C., especially 20° C.

Until the cooling by the second cooling medium has been initiated, the cooling is thus controlled in such a way that the cooling velocity of the outer surface of the component, i.e. the surface which later during use of the component will be in immediate contact with a corrosive medium, cools down at a cooling velocity in the order of 10–25° C./seconds. It is evident that the cooling velocity at the surface is to be such that also an area most closely beneath the surface also has been able to be cooled down in substantially the same way as has been described for the surface. Consequently, it is desirable that a layer, the thickness of which may vary from case to case, most closely beneath said surface has cooled down substantially in the manner described for the surface and thus achieved secondary phase particles having such a size and distribution that this layer has a proper corrosion resistance if it would be subjected to immediate contact with the corrosive medium in which the component, in this case the rod, is intended to be used.

The rest of the cooling of the component in the second cooling medium is to result in such a cooling velocity of the alloy of the component that the α-phase lamellae formed in the alloy will not be unacceptably long and thick with regard to inter alia the strength properties of the alloy.

When the cooling has been terminated, the rod has an outer surface or an outer layer which has secondary phase particles with such a size and such a distribution that the corrosion resistance of said layer is promoted. Consequently, it is not necessary to machine away the outer layer in order to obtain a layer with a satisfactory second phase particle size and distribution with regard to the corrosion resistance. However, this would have been the case if the component in an ordinary manner had been rapidly cooled by β-quenching in water, i.e. immediate immersing in a water pool.

The component is in this case a rod to be used as a cladding tube in a nuclear power plant. It could as well be a spacer, box-sheet, guide tube or the like. It will be subjected to a corrosive environment, which may be oxidising as well as reducing and contain a corrosive medium, for instance cooling water, with which surfaces of the component are in immediate contact. In addition, it is subjected to nuclear radiation of the type of fast neutrons.

A plurality of variants and alternative embodiments of the invention will in an easy manner be evident to a person skilled in the art but will be covered by the inventive thought as it is defined in the claims attached.

What is claimed is:

1. A method for producing a component suited to be subjected to an increased radiation in a corrosive environment, wherein the component includes a zirconium-based alloy, which at a first, high temperature has a BCC-structure and which at a second, lower temperature has an HCP-structure, wherein the alloy includes at least one alloying element which has a low solubility in the HCP-structure and wherein the alloy is quenched from the first temperature to the second temperature while secondary phase particles, which include said alloying element and which contribute to improve corrosion properties of the alloy, are separated in the HCP-structure, characterized in that the quenching is performed in two stages, wherein the first stage includes cooling at a relatively lower rate and the second, subsequent stage includes cooling at a relatively higher rate.

2. The method according to claim 1, characterized in that the first stage is controlled in such a way that the cooling rate at least at an alloy surface of the component, which surface is suited to be in direct contact with the corrosive environment, is lower than in should have been in if the cooling had involved quenching of the component in water.

3. The method according to claim 1, characterized in that the radiation is of the type of fast neutrons.

4. The method according to claim 1, characterized in that said cooling rate in the first stage is lower than 100° C./second.

5. The method according to claim 1, characterized in that a cooling medium having a lower cooling performance than water is employed at least during an initial phase of the quenching in order to achieve said relatively lower cooling rate.

6. The method according to claim 1, characterized in that said alloying element includes at least one of the elements Fe, Ni, Cr, V, W, or Si.

7. The method according to claim 1, characterized in that the component is intended for use in a nuclear reactor plant.

8. The method according to claim 1, characterized in that the quenching includes a β-quenching of the component.

9. The method according to claim 1, characterized in that said cooling rate in the first stage is lower than 50° C./second.

10. The method according to claim 1, characterized in that said cooling rate in the first stage is lower than 25° C./second.

11. The method according to claim 1, characterized in that the quenching is performed in the first stage by bringing the component into contact with a first cooling medium having a lower cooling performance, whereafter it in the second stage is brought into contact with and cooled by means of a second cooling medium having a higher cooling performance than the first cooling medium.

12. The method according to claim 11, characterized in that the first cooling medium is the same as but has a higher temperature than the second cooling medium.

13. The method according to claim 11, characterized in that the first cooling medium is a gas and the second cooling medium is a liquid.

14. The method according to claim 11, characterized in that the cooling by means of the first cooling medium continues until a predetermined temperature is obtained at said alloy surface.

15. The method according to claim 14, characterized in that the predetermined temperature lies in a range where a substantial part of the alloy at said alloy surface of the component is transferred from the first structure to the second structure.

* * * * *